United States Patent [19]

Funakubo

[11] 4,023,253

[45] May 17, 1977

[54] GRINDER PLATE FOR MEAT CHOPPERS AND METHOD OF MANUFACTURING THE SAME

[76] Inventor: Shinnosuke Funakubo, 3-6-1, Gyotoku Ekimae, Ichikawa, Chiba, Japan

[22] Filed: Oct. 14, 1975

[21] Appl. No.: 621,874

[30] Foreign Application Priority Data

| | | |
|---|---|---|
| July 30, 1975 | Japan | 50-92071 |
| July 30, 1975 | Japan | 50-92072 |

[52] U.S. Cl. .................................. 428/566; 75/200; 75/214; 75/222; 148/126; 241/82.7; 428/596

[51] Int. Cl.² ...................... C22C 1/04; A47J 43/25; B22F 2/00

[58] Field of Search ................. 75/214, 222, 208 R, 75/200; 241/82.7; 29/182; 148/126

[56] References Cited

UNITED STATES PATENTS

| | | | |
|---|---|---|---|
| 649,770 | 5/1900 | Snow | 241/82.7 |
| 1,647,196 | 11/1927 | Rollman | 241/82.7 |
| 3,343,954 | 9/1967 | Brab | 75/200 |
| 3,429,700 | 2/1969 | Wiegand et al. | 75/208 R |
| 3,506,500 | 4/1970 | Talmage | 75/214 X |
| 3,901,661 | 8/1975 | Kondo | 75/200 X |

OTHER PUBLICATIONS

Hirschhorn, J. S., Introduction to Powder Metallurgy, Pub. by American Powd. Met. Ins., N.Y. 1969, pp. 2–4.

*Primary Examiner*—Richard E. Schafer
*Attorney, Agent, or Firm*—Shlesinger, Fitzsimmons & Shlesinger

[57] ABSTRACT

A grinder plate for meat choppers having integral polygonal through holes is produced by powder metallurgy, and pores given to the plate at a porosity of 5 – 15% are impregnated with oil for providing the plate with self-cleaning and self-sharpening effects.

2 Claims, 1 Drawing Figure

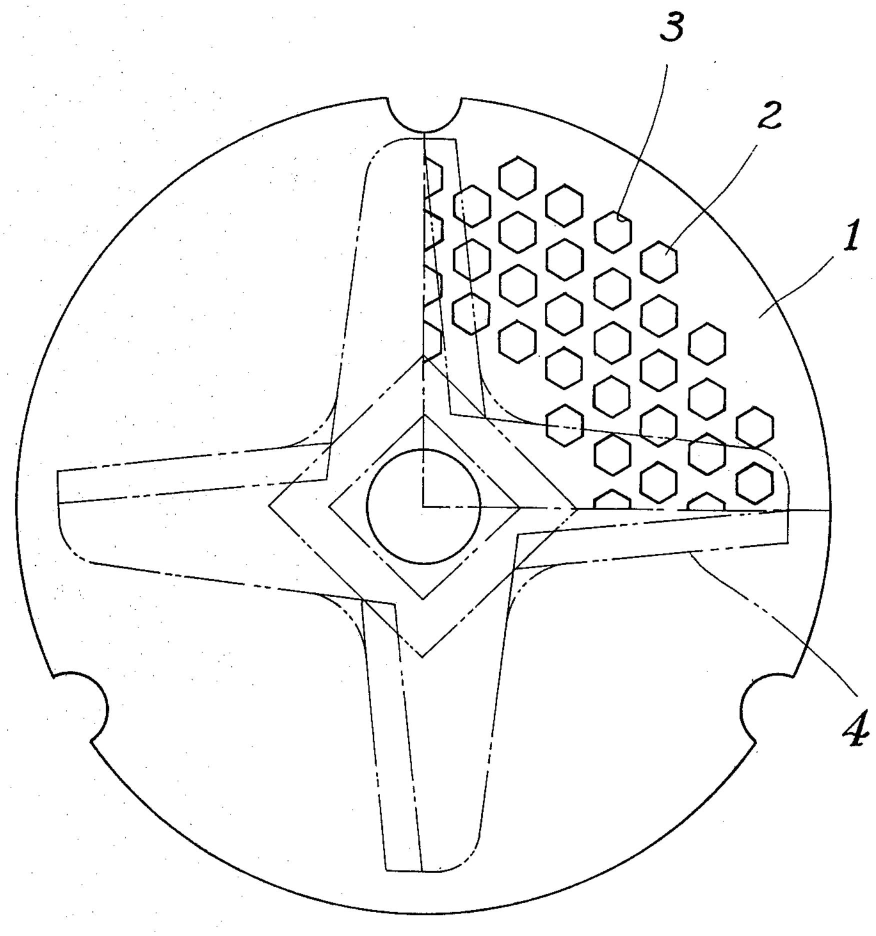
3
2
1
4

GRINDER PLATE FOR MEAT CHOPPERS AND METHOD OF MANUFACTURING THE SAME

This invention relates to a grinder plate for meat choppers, and a method for manufacturing the same.

Meat put into a meat chopper is forcedly fed toward and against a grinder plate by a rotating screw auger, whereby the meat is partially pressed into a number of through holes provided to the grinder plate, then chopped by a knife rotating with the screw auger and producing a shearing or cutting force in cooperation with the grinder plate, and released from the meat chopper.

In a meat chopper of the kind mentioned above, through holes of its grinder plate are mostly made by machining a discal steel plate. This has to be made, as a matter of course, with high accuracy, and requires costly labour. While those through holes which give the meat a shearing and chopping force in cooperation with a knife are mostly round, it is found that through holes having polygonal openings or sections can give the meat a larger and sharper shearing force. However, it is nearly impossible to provide a grinder plate precisely with a desired number of polygonal through holes by machining, because of a fact that it requires highest accuracy as aforementioned to make such holes even when they are round.

Hence, it is one of the objects of this invention to provide a grinder plate for meat choppers having a number of holes which extend axially through the plate and have polygonal openings, shearing force producible between the plate and a knife which rotates in abutment with the inner surface of the plate thereby reaching a maximum on account of the fact that meat being subjected to chopping is caught between two linear sharp cutting edges, viz., the cutting edge of the knife and a linear side of the polygonal holes. Such efficiency of polygonal holes can readily be understood, when the efficiencies of a pair of scissors having two linear sharp blades and another scissors having a sharp blade and a round blade are compared with each other. The former scissors may be comparable with a meat chopping knife working with linear sides of polygonal holes of a grinder plate, and the latters may be comparable with a knife cooperating with round holes of the plate.

In accordance with this invention, a grinder plate for meat choppers having integral polygonal through holes is manufactured by a unique method, which comprises impressedly molding a powdery metallic mixture into a grinder plate of a desired configuration having polygonal holes integrally extending therethrough, and sintering the plate thus obtained.

The present invention has another advantage that pores produced within the plate in course of making it are impregnated with mineral or vegetable oil, whereby the plate can have self-sharpening and self-cleaning effects. It is known that cutting efficiencies of meat cutting machines including such meat choppers as related to this invention are remarkably lessened as the cutting operation goes on, because a fatty substance from meat gathers excessively around the cutting members of the machines. In order to avoid the decrease of cutting effects of the machines due to adhesion of the fatty substance thereto, mineral oil and the like are sprayed at times onto cutting members of machines for washing away the fatty substance from said members.

In a grinder plate made in accordance with the present invention, however, the occasional spray of oil onto the plate is not needed on account of the oil impregnated into the plate, which washes away fatty matters adhered onto the plate and knife and sharpens them.

Hence, it is another object of the present invention to provide a grinder plate afforded with self-cleaning and self-sharpening effects on account of oil impregnated into pores of the plate.

It is a further object of this invention to provide a method of manufacturing a grinder plate for meat choppers having self-cleaning and self-sharpening efficiencies, which method comprising immersing into oil the grinder plate which is made powder metallurgically and provided with a number of pores.

In the accompanying drawing which shows a plan view of a grinder plate made in accordance with the present invention, a knife cooperating with the plate is shown by chained lines.

Now, referring to the drawing, a grinder plate body 1 which is discal, has a number of holes 2 which extend axially through the plate body 1. Edges 3 of the through holes 2 are polygonal at least at the sides confronting to a knife 4. Blades of the knife rotate in abutment with the inner surface of grinder plate, to which the polygonal edges of the holes open. Said plate body is made from a powdery metallic mixture which is compressedly molded and sintered into the discal shape of said plate, while detailed manufacturing steps shall be explained hereinafter. A desired number of polygonal holes 2 are provided to the plate body 1 integrally with said body and are formed simultaneously with the molding of the said body.

An example of this invention is given in the following.

A discal grinder plate body 1 of 69.8 mm in diameter and 7.9 mm in thickness and integrally and evenly provided with 120 hexagonal through holes 2 is made in accordance with this invention. Each diagonals of the hexagonal edges 3 of holes 2 is 3.7 mm.

A powdery metallic mixture consisting of 93 weight % of Fe, 2 weight % of Cu, 4 weight % of Ni and 1 weight % of C was molded at the pressure of 6 $T/cm^2$ so as to have the above-mentioned configuration and holes. The plate thus molded was sintered at the temperature of 1,150° C for 45 minutes and under a nonoxidizing atmosphere, and allowed to cool to a room temperature under the same nonoxidizing atmosphere. The plate was then heated to about 830° C and quenched by water, and annealed. The plate was immersed for 30 minutes into mineral oil heated to a temperature between 50° to 80° C, whereby the pores of the plate having a porosity of 5 – 15% were impregnated with said oil.

The grinder plate thus obtained was employed in a conventional meat chopper. The chopper continued to perform the grinding of meat most effectively without a noticeable adhesion of fatty matters on and around the plate.

What is claimed is:

1. A method of manufacturing a discal grinder plate for meat choppers, which comprises compressedly molding and sintering a powdery metallic mixture into a configuration of said plate having a plurality of spaced polygonal holes extending completely through said plate, said mixture consisting essentially of 93% by weight of Fe, 2% by weight of Cu, 4% by weight of Ni and 1% by weight of carbon, and the compression molding and sintering of the plate being made at a pressure of approximately 6.0 tons per square centimeter and at a temperature of approximately 1,150° C so as to give the plate a porosity of 5–15%, subjecting the plate to a heat treatment, and impregnating the pores of the plate by immersing it into heated oil after the heat treatment, whereby said pores thereof are impregnated with the oil to provide the plate with self-cleaning properties.

2. A grinder plate for meat choppers produced in accordance with the method defined in claim 1.

* * * * *